March 12, 1968     WEI TEH CHOW     3,372,486
VOLUME MEASURING DEVICES

Filed May 15, 1967     4 Sheets-Sheet 1

INVENTOR.
Wei Teh Chow

March 12, 1968  WEI TEH CHOW  3,372,486
VOLUME MEASURING DEVICES

Filed May 15, 1967  4 Sheets-Sheet 2

INVENTOR.
Wei Teh Chow

March 12, 1968  WEI TEH CHOW  3,372,486
VOLUME MEASURING DEVICES
Filed May 15, 1967  4 Sheets-Sheet 3

INVENTOR.
Wei Teh Chow

March 12, 1968     WEI TEH CHOW     3,372,486
VOLUME MEASURING DEVICES
Filed May 15, 1967     4 Sheets-Sheet 4

INVENTOR.
Wei Teh Chow 3,372,486
VOLUME MEASURING DEVICES
Wei Teh Chow, 605 Water St., New York, N.Y. 10002
Continuation-in-part of application Ser. No. 493,642,
Oct. 7, 1965. This application May 15, 1967, Ser.
No. 650,559
10 Claims. (Cl. 33—1)

ABSTRACT OF THE DISCLOSURE

A volume-measuring device for orthogonal objects comprising linear-measurement means and area-measurement means. Both are arranged to be operable from a single, substantially flat, working surface. Utilization of one means leads to the selection of the proper one of a set of the other measurement means to measure the second component and to provide a direct reading of the volume of the measured object in a single operation after the object to be measured is properly aligned with respect to the measurement means.

---

This application is a continuation-in-part of my application, Ser. No. 493,642, filed Oct. 7, 1965, and now abandoned.

This invention relates to volume- measuring devices and especially to a simple device for measuring the volume of luggage.

In the loading of aircraft baggage compartments, it is useful to know the volumes of the pieces of luggage which are to be loaded into each compartment so that the available space can be used efficiently. The customary method for calculating the volume of a rectangular piece of luggage, which is the form of perhaps 90% of all luggage, is to use a ruler or tape measure, take three measurements (length, width and height) and multiply the three measurements together. This method is time-consuming, requires personnel capable of making arithmetical calculations and has a substantial probability of error.

The objects and advantages of the present invention are accomplished by means of a device in which one volume component of the object to be measured is used as a selector for the proper one of a set of measuring devices to be used to measure the other component of volume, the measuring device being marked directly in terms of volume. The invention uses a volume-measuring system in which volume is broken into two components which, when multiplied, provide the volume. There is a single linear dimension component and an area component in this system, a single operation measuring each of the two components in contrast with the conventional method in which a separate operation measures each of three linear dimensions which are then multiplied together to obtain volume.

Hereinafter, only the two-component system of volume measurement will be considered in connection with the invention.

An object of this invention is to measure the volume of substantially rectangular objects in a simple manner requiring no arithmetical calculations.

Another object is to provide simple means for determining the volume of substantially rectangular objects without the necessity of taking three measurements and multiplying them.

Other objects and many of the attendant advantages of this invention will be readily appreciated as the same becomes better understood by reference to the following description when considered in connection with the accompanying drawings wherein.

Hereinafter, it will be understood that the invention deals with the measurement of volumes of objects that are substantially orthogonal in structure, i.e., objects having six sides, each of which is substantially rectangular or square in shape, the planes of sides which meet each other being separated substantially by right angles. Such a structure will be said to be or have an "orthogonal volume."

Volume of such objects is conventionally measured by taking length, width and height measurements in separate operations and then multiplying the three values. However, if the area of one side can be measured directly, it is then necessary to take only a single linear measurement to get the volume. Such a system may be termed a two-component system of volume measurement, area being one component of the volume and the third linear dimension (i.e., the one which is not part of the previously obtained area) being the second component. The order of use of the two volume components is, of course, immaterial.

As shown in isometric view in FIG. 1, the volume-measuring device basically consists of two elements, single-dimension-measuring means and area-measurement means (which may hereinafter also be designated area-matching means).

The actual physical structure of this embodiment may comprise a box 10 on wheels, or casters, 12, the top, or working, surface of the ceiling of the box 10 being constructed to provide the single-dimension-measurement means and the body of the box supporting and containing the area-matching means.

Figure 2A:
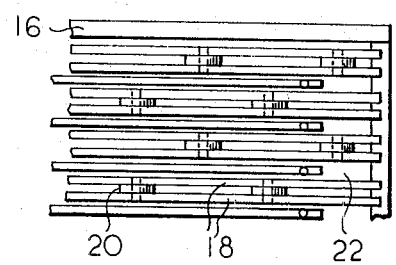
FIGURE 2A is a top view of the upper right-hand corner of the top of the box.
Figure 2B:
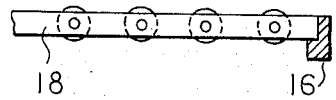
FIGURE 2B is a front view of FIGURE 2A.
Figure 3:
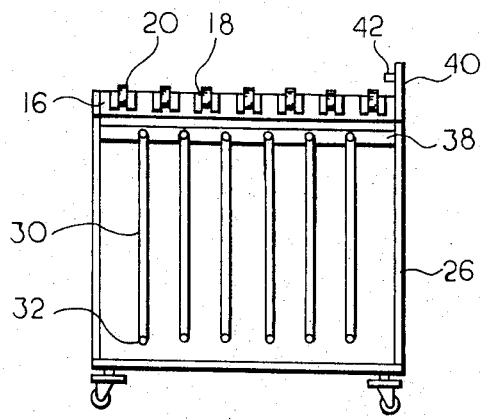
FIGURE 3 is a cross-sectional view taken along line A–A' through FIGURE 1.

The top of the box is removable and in this particular embodiment is formed with a roughly rectangular supporting frame 16 bearing long spacing bars 18 which are regularly spaced from each other. The supporting frame 16 and the bars 18 may be of wood or metal, for example. FIG. 2A shows a top view of the upper right-hand corner of the top 14 of the box and FIG. 2B is a front view of FIG. 2A. The supporting frame 16 may be fabricated from ½ or 1-inch thick stock and the bars 18 may be ⅛ inch wide on top by 1 inch deep, for example. The spacing bars 18 are paired to support rollers 20 between them. The space between any two adjacent pairs of bars may be called an inter-bar space 22. With the exemplary dimensions just given, the spacing of the bars is such that there is approximately a ½ inch distance between the midpoints of any two successive inter-bar spaces 22. Of course, this inter-bar distance is characteristic only of this particular embodiment and may be varied in other embodiments if desired, being easily increased to 1 inch spacings, for example. The supporting frame 16 can be viewed as a perforated board (horizontal) supported by four walls (vertical) which serve to mount the board on the lower part, or the body, of the box 10.

The body of the box 10 supports area-measuring means comprising, a plurality of flags 28, each fabricated from a sheet of a tough, transparent material such as a polyester film like Mylar. Each flag 28 is supported by a thin frame 32 which may be made of metal. At one end of the flagstaff, a counterpoise 34 is mounted and a handle 36 extends upwards from the other end of the flagstaff above the surface of the bars 18. Each flag 28 is mounted pivotally on a rod 38 with its handle 36 extending up through an inter-bar space 22 in such position that the flag 28 itself can be pulled up through the inter-bar space 22 above the top surface of the box, as shown in dotted lines in FIG. 1.

Figure 4:
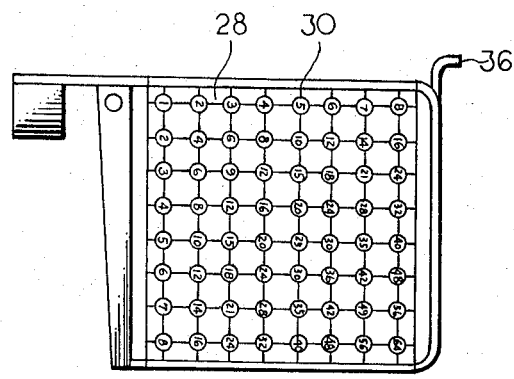
FIGURE 4 is an illustration of one of the area-matching flags used in the invention.

The sheets are covered by sets of orthogonally ruled lines and the corners of the boxes formed by the lines are numbered. The spacing between each succeeding line of a set may be either ½ or 1 inch, according to the accuracy desired. As shown in FIG. 4 where the flag is in its upright position, the intersections of the lines are marked with numbers indicating volumes.

Figure 1:
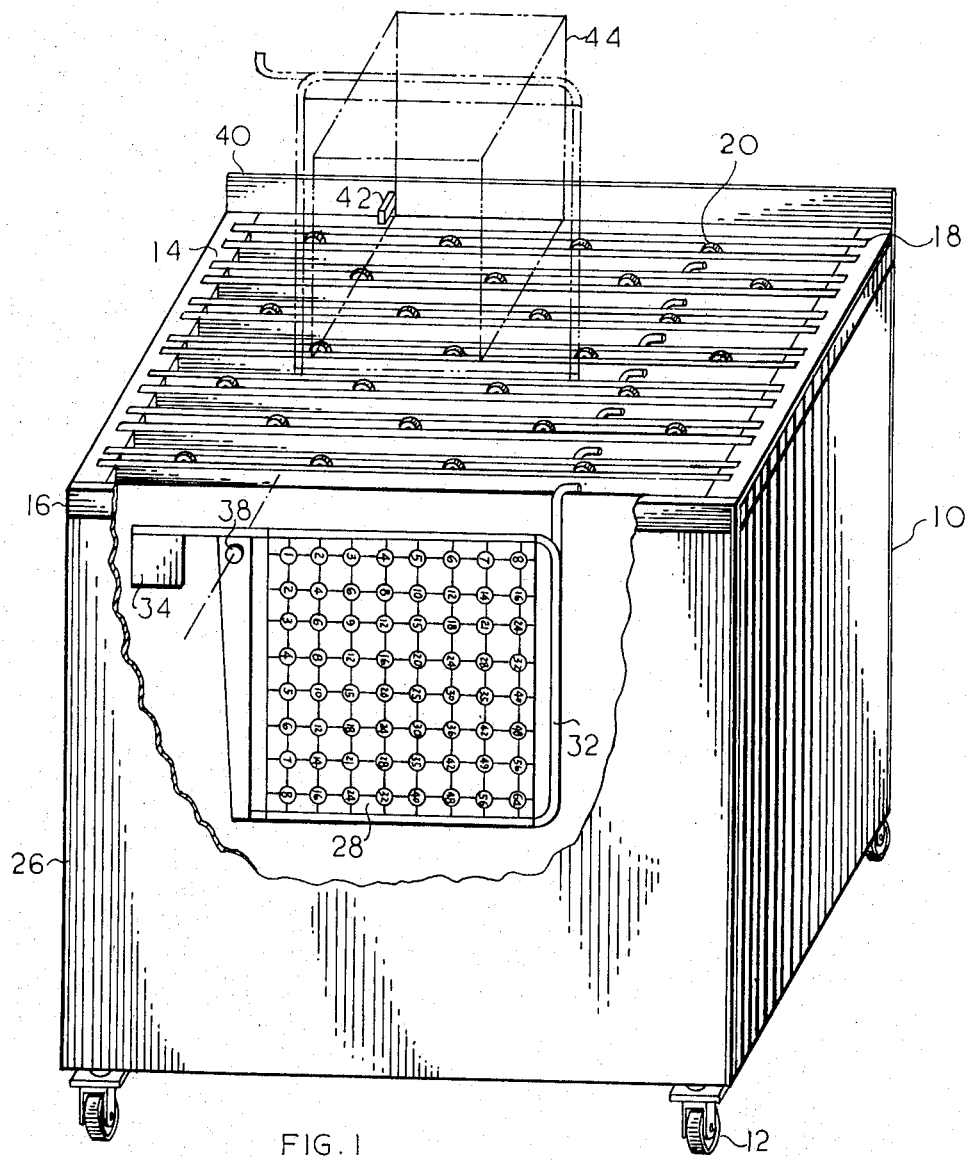
FIGURE 1 is an isometric view of an embodiment of the invention partially broken away to show one of the area-matching flags in its rest position.

The numbers shown on the flags in FIGS. 1 and 4 are merely intended to be indicative of proper ratios, not to be the specific numbers actually used. The specific numbers which are used differ from one flag to another according to the distance of any particular flag from the backstop 40.

A backstop 40 comprising a flat board of metal or wood is fastened to the back of the top 14 of the box and extends up beyond the top surface. A small stop 42 extends perpendicularly outward from the backstop over the top surface of the box. The backstop 40 and the stop 42 together form what might be termed positioning means, or position-reference means, since the measurement of volume is taken with the corner formed between the backstop and the stop as the starting point. The essence of the position-reference means is simply a marker or point on which the proper corner of the object to be measured is aligned before measurement; the stop and backstop are not necessary although they are convenient for rapid alignment of the measured object.

In operation, the invention can be rolled up to a conveyor belt which is carrying pieces of luggage, for example. A piece of luggage 44 is slid from the conveyor belt across the rollers 20 onto the surface of the box 10. One corner is initially positioned against the backstop 40 and against the stop 42, as indicated in dotted lines in FIG. 1.

The flag 28 in the inter-bar space 22 nearest the free end of the luggage is now pulled up and the end area of the luggage fits one of the rectangular areas marked on the flag. The upper right corner of this rectangle is marked with a number 30 which is the result of multiplying the distance from the backstop 40 to the inter-bar space 22 (the length of the luggage) with the rectangular area (the end area of the luggage). All the operator need do is read off this number to obtain the volume of the luggage. It is apparent, of course, that the sets of numbers on the flags 28 differ in accordance with the distance of the particular flag (or the mid-point of its associated inter-bar space 22) from the backstop 40 and the stop 42. The upper right-hand corner of the ruled rectangular area is marked with the volume equalling that particular area times the length corresponding to that particular flag. Thus, all the operator has to do is to match the position of the upper right-hand corner of the luggage with the upper right-hand corner of one of the ruled rectangles and read off the volume directly.

Figure 5:
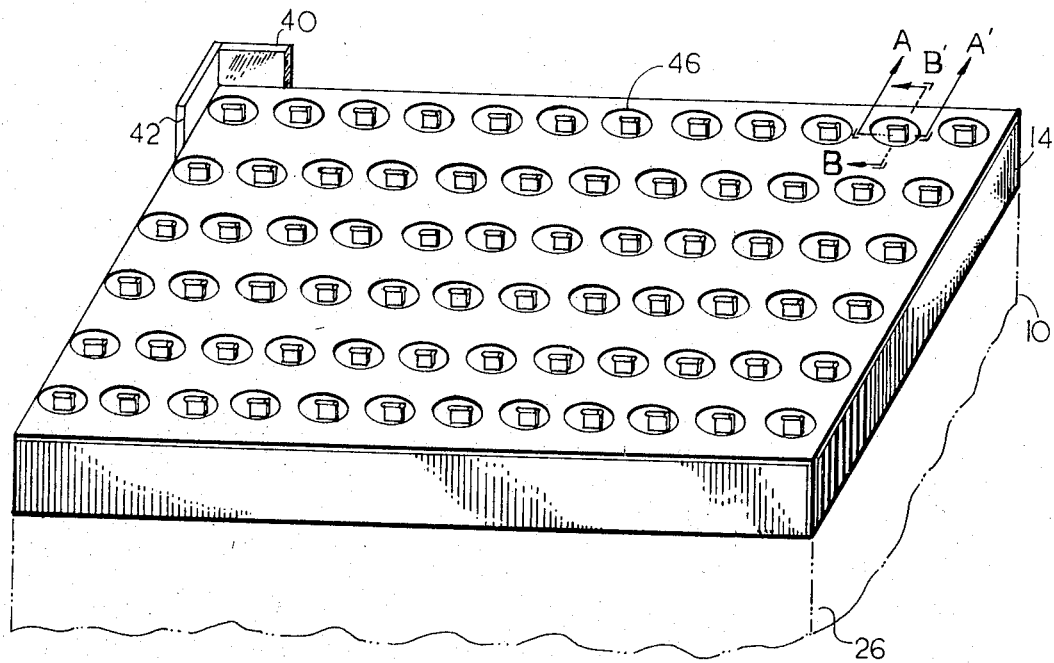
FIGURE 5 is an isometric view of a second embodiment of the invention.
Figure 6A:
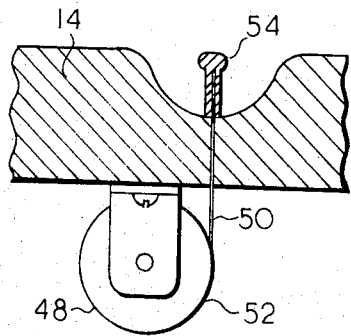
FIGURE 6A is a fragmentary cross-sectional view taken through the cover of the box shown in FIG. 5 along line A–A'.
Figure 6B:
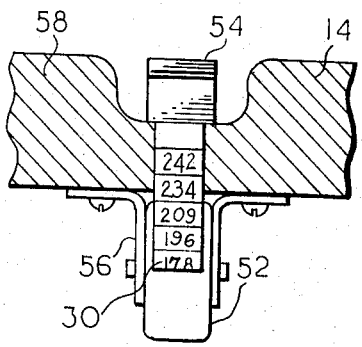
FIGURE 6B is a fragmentary cross-sectional view taken through the cover of the box shown in FIG. 5 along line B–B'.

A second embodiment of the invention is shown in FIGS. 5, 6A and 6B. The top 14 of the box 10 has a backstop 40 and a stop 42 forming a position-reference corner. The stop 42 may be placed at the left side of the top 14 of the box.

Holes 46 are spaced in parallel rows and columns spaced from each other and from the back and left sides of the cover as shown in FIG. 5. This spacing can be varied, depending on the desired accuracy of results.

Tape measures 48, preferably of the steel self-rectracting type, are mounted on the underside of the cover by any suitable means, such as supporting brackets 56. Each tape measure 48 is mounted near, and is thus associated with, a different hole 46. Its tape 50 can be pulled up through the hole 46 by means of an end tab 54 which extends up through the hole 46 but does not extend above the top surface 58 of the cover.

Each tape 48 is marked with a set of volume numbers, or values, 30 which equal the product of the height of the object to be measured (as indicated by the length of tape which is exposed when the tap 54 is placed at the top level of the object) and the bottom rectangular area associated with that particular tape. The bottom area is measured by the rectangle of which the position-reference corner is the upper left-hand corner (as seen in FIG. 5) and of which the hole associated with the tape being used is the lower right-hand corner. The tape which is used is, of course, the tape associated with that unobstructed hole which is closest to the lower right-hand corner of the bottom area of the object whose volume is to be measured.

It should be noted that the ceiling, or upper board, of the box which supports the object to be measured also comprises measurement means in both illustrated embodiments, i.e., in FIG. 1, the upper board also comprises the single-dimension measurement means and in FIG. 5 the upper board also comprises the area-measurement means. The measurement means in such a case is said to be "integral with" the board or working surface.

To summarize generally then, the gist of the invention lies in a single, perforated board which has integral therewith one of the two volume-measurement means. The other volume-component measurement means is mounted in such a way that the measurement means can be extended through the perforations to make the measurement orthogonally to the first measurement, the working surface being substantially flat at all times other than when a measurement means is so extended. The board includes position-reference means for proper alignment of the object to be measured relative to the volume-component measurement means. A supporting box for the board may be included although this is not an essential element.

Figure 7:
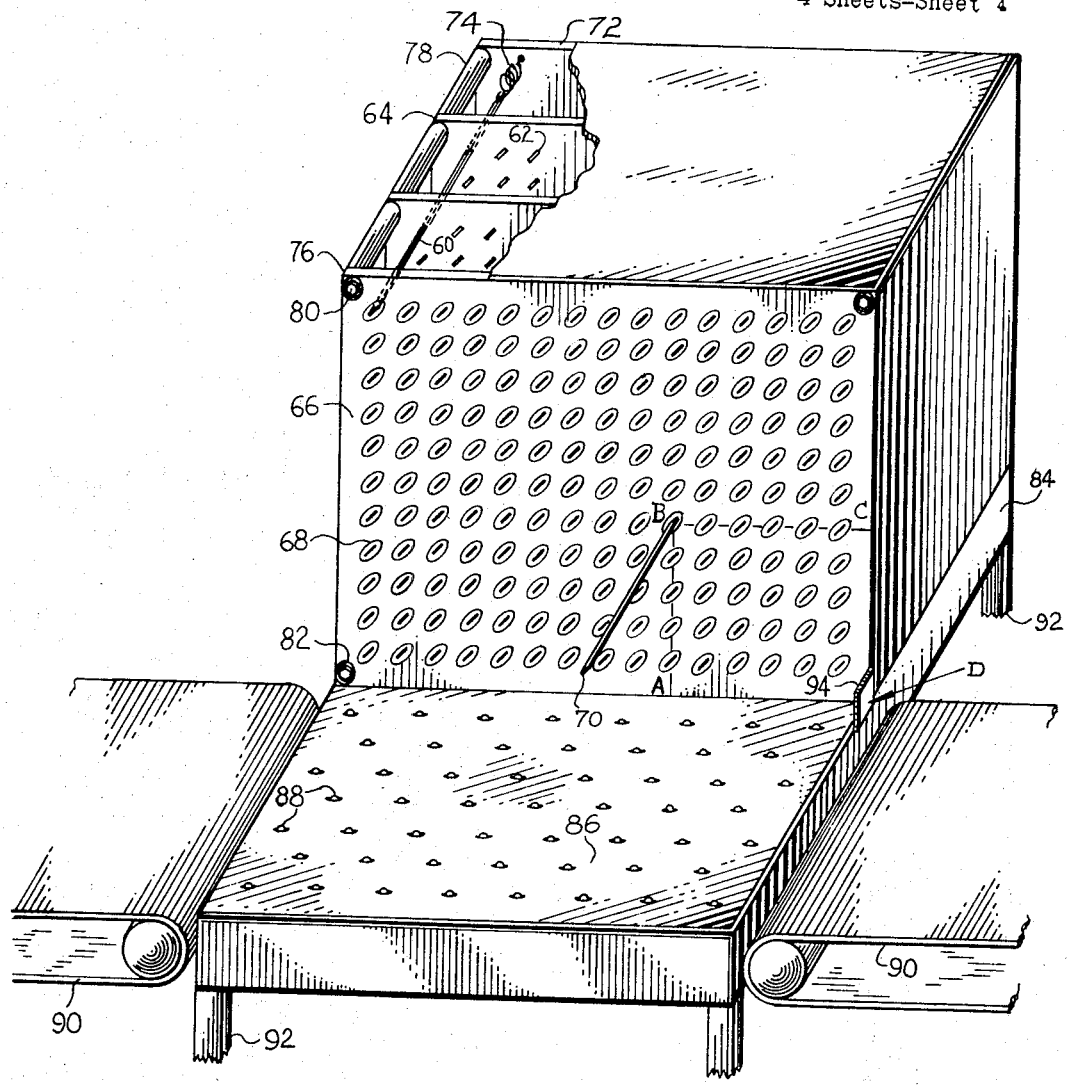
FIGURE 7 is an isometric view, partially broken away, of a third embodiment of the invention.

FIG. 7 illustrates another embodiment of the invention. Measuring sticks 60, or rulers, comprising the linear-dimension measurement means, extend through perforations 62 in one or more guide plates 64. One end of each measuring stick 60 lies flush with the working surface 66 of what was the upper board of the previous embodiments and now may be termed the front board 76. This end lies in a depression 68 in the working surface 66 which permits the operator's fingers to grasp the end and pull it out for a measurement as shown by the extended measuring stick 70.

The other end of each stick 60 is attached to the rear plate 72 by a biasing means 74 which may be a spring or strip of rubber so that the stick is automatically pulled back after a measurement is made. The biasing means and rear plate are not absolutely necessary since a stick 60 may be pushed back into its original position manually after a measurement is made.

The front board 76, guide plates 64 and rear board 72 are spaced from each other by hollow cylindrical spacers 78 and are held together by a long bolt which extends through the spacers, boards and plates and on the rear end of which a nut is screwed. The head 80 of the bolt is shown in its indentation 82, or recess, in the front plate 76; it does not extend beyond the working surface 66. There may be four bolts, one at each corner, if the bottoms of the boards and plates are not fastened to some type of base 84, as shown.

The embodiment of FIG. 7 is shown as having a base 84 and a front extension member 86 in which ball rollers 88 are set. This front extension member 86 may be placed in an opening between two conveyor belts 90 and may be part of a weighing scale. The front extension member 86 may be omitted if desired and the board-and-plate assembly, which can be supported at the proper height by legs 92, shown broken away, can be placed so that its working surface 66 abuts the rear edge of a single conveyor belt which has no opening.

The front plate 76 preferably has a movable stop 94 at its position-reference corner (the lower right-hand corner if the conveyor belt moves from left to right). Motor-and-switch means may be arranged to swing the stop 94 out of the way when the measurement has been made so that the object can be sent on its way down the conveyor belt with a slight push.

As is evident, the extended stick 70 lies at the corner of a rectangle ABCD which is diagonally opposite the position-reference corner D, the lower right-hand corner of the working surface 66. The position-reference corner is common to a set of rectangles at the diagonally opposite corner of each of which lies a different measuring stick. Each measuring stick is specifically marked in terms of the area of its associated rectangle, so that it shows the volume equal to the area multiplied by the length to which it is extended.

A further embodiment (not shown) may employ longitudinal tubes of rigid material for housing the measuring sticks, the tubes being fastened together to form an assembly looking somewhat like a rocket launcher. The open ends of the tubes can form the working surface or the open ends can be covered by a perforated guide plate through which the sticks can be extended for measurements. Each stick can be fastened to the closed end of its tube by a biasing means.

Obviously, many modifications and variations of the present invention are possible in the light of the above teachings. It is therefore to be understood that within the scope of the appended claims the invention may be practiced otherwise than as specifically described.

I claim:

1. A volume-measuring device for the measurement of the volumes of a plurality of objects having different, substantially orthogonal volumes comprising, in combination:

board means comprising a board formed with apertures therein and having a substantially flat working surface, said board means providing first means visible at the working surface for measuring one of the volume components of an object to be measured, second means for measuring the second volume component, said second means being mounted to be extensible through said apertures and said working surface when measurements are to be made but normally not interfering with the substantial flatness of said working surface, one of said measurement means being constructed to provide an areal measurement and the other being constructed to provide a linear measurement orthogonal to the areal measurement; and position-reference means carried by said board for aligning the object to be measured relative to one of said measurement means.

2. A volume-measuring device as in claim 1, further including supporting means for supporting said board means in such position that said working surface forms a surface for supporting said object to be measured.

3. A volume-measuring device as in claim 1, wherein said apertures are regularly spaced in rows and columns and each aperture is located at the corner of a different rectangle of which said position-reference means forms the diagonally opposite corner, said position-reference means thereby forming a common corner for all the rectangles.

4. A volume-measuring device as in claim 1, wherein said first means matches a linear dimension of the object, and said second means comprises a plurality of area-matching means, the proper one for a specific object being indicated by said first means, each area-matching means being marked with a set of rectangles gradually increasing in size, each said rectangle being marked with a number equalling the volume corresponding to its area multiplied by the linear dimension associated with that particular area-matching means.

5. A device as in claim 1, including a box having a cover and a body, said cover comprising a substantially rectangular frame having an uprightly extending backstop and a stop extending forward from said backstop and forming a position-reference corner with said backstop, and a plurality of bars set in said frame and extending parallel to each other and to said backstop, said bars being spaced from each other by inter-bar spaces, said bars, frame and spaces forming said apertured board means, and said second means comprising a plurality of area-matching means, each area-matching means comprising a frame including a flagstaff portion, a counterweight located at one end of said flagstaff, a flag attached to the other end of said flagstaff, and a handle, each said flag having inscribed thereon a grid of orthogonal lines forming rectangles which gradually increase in area, said set of area-matching means being pivotably mounted on said box so that the flags are ordinarily within said box with the handles extending somewhat outside of said box and so that each frame is immediately beneath a different one of said inter-bar spaces, each flag thereby being associated with a linear dimension corresponding to the distance of its associated inter-bar space from said backstop, each rectangle on a given flag being marked in terms of the volume equalling the area enclosed by the rectangle multiplied by the linear dimension from the backstop to the inter-bar space associated with that given flag.

6. A device as in claim 1, including a box having a cover, said cover including a backstop extending upwardly therefrom and a stop extending forwardly from said backstop and forming a position-reference corner therewith, said cover comprising said board means, said apertures being located at the intersections of two sets of imaginary, regularly spaced lines, each set being orthogonal to the other, each aperture being located on a rectangle formed by said regularly spaced lines at a corner diagonally opposite said position-reference corner which is a common corner of all said rectangles, and said second means comprises a plurality of tape measures, each mounted within said cover near a different one of said apertures so that the tape is associated with and may be pulled up through the aperture, each tape being marked with a set of spaced numbers, each number equalling the volume obtained by multiplying the area of the rectangle on a corner of which its associated aperture is located by the length of the tape up to the point on the tape at which the particular number is inscribed.

7. A device as in claim 3, wherein:
said second means comprises a plurality of measuring sticks and means for slidably supporting said sticks, each stick being associated with a different one of said apertures,
  each stick being marked with a set of spaced numbers, each number equalling the volume obtained by multiplying the length of the stick up to the point at which the particular number is inscribed by the area of the rectangle on the corner of which that stick is located.

8. A device as in claim 3, wherein:
said second means comprises a plurality of tape measures, and means for rollably supporting said tape measures,
  each tape being marked with a set of spaced numbers, each number equalling the volume obtained by multiplying the length of the tape up to the point at which the particular number is inscribed by the area of the rectangle on the corner of which that tape is located.

9. A volume-measuring device for the volume measurement of a plurality of objects having different, substantially orthogonal volumes comprising, in combination:
first means for matching one of the volume components of the object, said first means comprising support means for said object having a substantially flat surface and including position-reference means mounted on said surface,
  said support means being formed with a plurality of holes in its surface, said holes being located at the intersections of two orthogonal sets of imaginary, regularly spaced lines,
  said sets of lines forming a grid containing a set of rectangles which have a common corner,
  said position-reference means being located at the common corner of each of said rectangles and each said hole being located at the corner of a different one of said rectangles diagonally opposite said common corner; and
a set of means for matching the second component of the volume, said set of means comprising a plurality of linear measurement means, each being mounted on said support means near a different one of said holes and being associated with that hole, each said linear measurement means being mounted so that it can be pulled through its associated hole for measuring an object abutting the surface of said support means,
  each linear measurement means being marked with a set of spaced numbers, each number equalling the volume obtained by multiplying the area of the rectangle on a corner of which its associated hole is located by the length of the linear measurement means up to the point at which the particular number is inscribed.

10. A device as in claim 9, wherein said linear measurement means are tape measures.

References Cited

FOREIGN PATENTS 154,139   4/1956   Sweden.

ROBERT B. HULL, *Primary Examiner.*